United States Patent [19]
Cohen

[11] Patent Number: 5,943,865
[45] Date of Patent: Aug. 31, 1999

[54] REHEATING FLUE GAS FOR SELECTIVE CATALYTIC SYSTEMS

[76] Inventor: Mitchell B. Cohen, 19 Rustic La., West Hartford, Conn. 06107

[21] Appl. No.: 09/204,965

[22] Filed: Dec. 3, 1998

[51] Int. Cl.$^6$ .............................. F01K 7/34; F23D 15/00
[52] U.S. Cl. .............................. 60/653; 60/676; 110/345; 165/7; 423/239.1
[58] Field of Search .............................. 60/653, 666, 676; 110/345, 349; 165/5, 7; 422/171, 172, 181; 423/237, 239.1

[56] References Cited

U.S. PATENT DOCUMENTS

| | | | |
|---|---|---|---|
| 3,320,906 | 5/1967 | Domahidy . | |
| 4,160,009 | 7/1979 | Hamabe | 422/108 |
| 4,300,920 | 11/1981 | Grove | 55/84 |
| 4,310,498 | 1/1982 | Malki et al. | 423/242 |
| 4,705,101 | 11/1987 | Warner | 105/104.31 |
| 5,047,220 | 9/1991 | Polcer | 423/239 |
| 5,057,293 | 10/1991 | Epperly et al. | 423/235 |
| 5,151,256 | 9/1992 | Kato et al. | 423/210 |
| 5,233,934 | 8/1993 | Krigmont et al. | 110/345 |
| 5,237,939 | 8/1993 | Spoloyny et al. | 110/345 |
| 5,296,206 | 3/1994 | Cho et al. | 423/235 |
| 5,555,849 | 9/1996 | Wiechard et al. | 122/4 D |

*Primary Examiner*—Hoang Nguyen
*Attorney, Agent, or Firm*—Arthur E. Fournier, Jr.

[57] ABSTRACT

A method and apparatus for controlling the temperature of a flue gas stream entering a Selective Catalytic Reduction chamber in a steam generating power plant that utilizes Selective Catalytic Reduction (SCR) to lower $NO_x$ emissions is disclosed. The method involves the utilization of superheated steam to control the temperature of the flue gas prior to the flue gas entering the Selective Catalytic Reduction chamber such that there is a reduction in lost energy to the thermodynamic steam cycle caused by spray desuperheating.

16 Claims, 8 Drawing Sheets

REHEATING FLUE GAS FOR SELECTIVE CATALYTIC SYSTEMS

BACKGROUND OF THE INVENTION

This invention relates to a method of controlling the temperature of a flue gas stream entering a Selective Catalytic Reduction chamber in a steam generating power plant that utilizes Selective Catalytic Reduction (SCR) to lower $NO_x$ emissions and more specifically to the utilization of superheated steam to control the temperature of the flue gas prior to the flue gas entering a SCR chamber such that there is a reduction in lost energy to the thermodynamic steam cycle caused by spray desuperheating.

In recent years oxides of nitrogen, also known as $NO_x$, have been implicated as one of the elements contributing to the generation of acid rain and smog. Now, due to very strict state and federal environmental regulations demanding that $NO_x$ emissions be maintained at acceptable levels, the reduction of $NO_x$ both during and after the combustion process is of critical importance and a major concern in the design and operation of modern power plants. Oxides of nitrogen are a byproduct of the combustion of hydrocarbon fuels, such as pulverized coal, gas or oil and are found in two main forms. If the nitrogen originates from the air in which the combustion process occurs, the $NO_x$ is referred to as "thermal $NO_x$." Thermal $NO_x$ forms when very stable molecular nitrogen, $N_2$, is subjected to temperatures above about 2800° F. causing it to break down into elemental nitrogen, N, which can then combine with elemental or molecular oxygen to form NO or $NO_2$.

If the nitrogen originates as organically bound nitrogen within the fuel, the $NO_x$ is referred to as "fuel $NO_x$." The nitrogen content of coal, for instance, is comparatively small and, although only a fraction is ultimately converted to $NO_x$, it is the primary source of the total $NO_x$ emissions from a coal-fired steam generating power plant.

One post-combustion process for the lowering of $NO_x$ emissions is that of Selective Catalytic Reduction (SCR). Selective Catalytic Reduction systems use a catalyst and a reactant such as ammonia gas, $NH_3$, to dissociate $NO_x$ to molecular nitrogen, $N_2$, and water vapor. The catalytic process using ammonia as a reactant is governed by the following primary chemical reactions:

$$4NO + 4NH_3 + O_2 \xrightarrow{\text{catalyst}} 4N_2 + 6H_2O \quad (1)$$

$$2NO_2 + 4NH_3 + O_2 \xrightarrow{\text{catalyst}} 3N_2 + 6H_2O \quad (2)$$

Since $NO_x$ is approximately 95% NO in the flue gas stream, Equation 1 dominates the process.

Urea is a promising SCR reactant that is coming into use in lieu of ammonia. The catalytic process using urea as the reactant is governed by the following chemical equation:

$$CO(NH_2)_2 + 2NO + 1/2O_2 \xrightarrow{\text{catalyst}} 2N_2 + CO_2 + 2H_2O \quad (3)$$

A typical utility steam generating power plant utilizing Selective Catalytic Reduction as a $NO_x$ reduction technique comprises a furnace volume in fluid communication with a backpass volume. Combustion of hydrocarbon fuels occurs within the furnace volume creating hot flue gases that rise within the furnace volume giving up a portion of their energy to the working fluid of a thermodynamic steam cycle. The flue gases are then directed to and through the backpass volume wherein they give up additional energy to the working fluid. Upon exiting the backpass volume the flue gases are directed via a gas duct through a Selective Catalytic Reduction chamber and thence to an air preheater and flue gas cleaning systems thence to the atmosphere via a stack.

In a typical SCR system, at some point in the gas duct after the flue gas stream exits the backpass volume and upstream of the SCR chamber, a reactant, possibly ammonia, in a gaseous form, or a urea/water solution is introduced into, and encouraged to mix with, the flue gas stream. The reactant/flue gas mixture then enters the SCR chamber wherein the catalytic reductions, shown in Equations 1, 2 or 3 take place between the reactant/flue gas mixture and the catalytic material. The introduction of the ammonia or urea into the flue gas stream is typically achieved by the use of injector nozzles located at either the periphery of the gas duct, or immersed within the flue gas stream.

The design of a SCR system is dictated by such considerations as the $SO_3$ concentration, as well as the concentration of $NO_x$ entering and leaving the SCR chamber, the flue gas temperature, the ammonia/$NO_x$ stoichiometric ratio, the flue gas volumetric flow rate, the flue gas velocity, the flue gas oxygen and moisture content and the available surface area of the catalytic material. The SCR reaction chamber typically includes multiple layers of solid catalytic material lying within the path of the flue gas stream. The most common types of catalytic material in use and the approximate temperature ranges of the flue gas over which they are effective as catalysts are: Titanium Dioxide (270–400° C.), Zeolite (300–430° C.), Iron Oxide (380–430° C.) and activated coal/coke (100–150° C.).

Maintaining a minimum flue gas temperature helps prevent the formation of ammonium bisulfate and ammonium sulfate salts on the surface of the catalytic material due to any unreacted ammonia present in the flue gas. Such a formation reduces the effectiveness of the Selective Catalytic Reduction process. The type and amount of catalytic material for which a SCR system need be designed depends upon the flue gas volume, flue gas temperature, total $NO_x$ present in the flue gas, $NO_x$ reduction requirements, permissible ammonia slip, catalyst life requirements, amount of $SO_x$ present in the flue gas stream, ash loading in the flue gas and the uniformity of the temperature, velocity and concentration of the reactant in the flue gas stream as the mixture enters the SCR chamber.

The use of Selective Catalytic Reduction in lowering $NO_x$ emissions is not new. In particular U.S. Pat. No. 5,151,256, entitled "Coal Combustion Apparatus Provided With A Denitration" and which issued on Sep. 29, 1992, relates to a coal combustion apparatus devised so that a denitration catalyst can be hardly poisoned by volatile metal compounds contained in exhaust gases in a denitration means for catalytic reduction with ammonia, and a method for eliminating said volatile metal compounds from said exhaust gases.

Furthermore, it is seen that U.S. Pat. No. 5,233,934, entitled "Control Of $NO_x$ Reduction Flue Gas Flows" and which issued on Aug. 10, 1993, discloses an invention that relates to the reduction of pollutants produced by boilers, and, more particularly, to the control of the process for reducing $NO_x$ pollutants in the flue gas flows.

Further still, U.S. Pat. No. 5,237,939, entitled "Method And Apparatus For Reducing $NO_x$ Emissions" and which issued on Aug. 24, 1993, discloses an apparatus that reacts $NO_x$ in a flue gas stream with a nitrogenous compound such as a source of ammonia in the presence of a catalyst to reduce the $NO_x$ level of the flue gas.

Still further, U.S. Pat. No. 5,296,206, entitled "Using Flue Gas Energy To Vaporize Aqueous Reducing Agent For Reduction Of $NO_x$ In Flue Gas" and which issued on Mar. 22, 1994, discloses a method of vaporizing aqueous reducing agent for reducing $NO_x$ in flue gas originating in a combustion in which the $NO_x$ is generated.

During the operation of a steam generating power plant at low boiler loads, the minimum required temperature of the flue gas necessary for effective Selective Catalytic Reduction may not be attainable. To help ensure that the temperature of the flue gas stream is within the aforesaid temperature ranges while at low boiler loads, it is typical that a bypass duct is utilized to reheat the flue gas stream. The bypass duct typically passes from the backpass volume to the gas duct such that still relatively hot flue gases are diverted from the backpass volume to a point in the gas duct upstream of the location of the injection of the reactant into the SCR chamber.

The prior art has recognized the need to reheat flue gases that are generated from the combustion of fossil fuels as demonstrated prior art efforts directed toward the reduction of $NO_x$ and $SO_x$ emissions generated from the combustion of fossil fuels. In particular, with respect to the use of a bypass duct, U.S. Pat. No. 3,320,906, entitled "Fuel Burning Process And Apparatus" and which issued on May 23, 1967, discloses a technique for removing the sulfur compounds and particulate matter from the products of combustion or flue gases of steam generating and similar equipment and reheating the flue gases prior to discharge to the atmosphere. Further in the prior art U.S. Pat. No. 4,160,009 provides a boiler apparatus having a furnace and a plurality of heat exchangers disposed in a combustion gas channel between the furnace and boiler apparatus exits, the improvement comprising a denitrator having a catalyst disposed in the combustion gas channel downstream of at least one of the heat exchangers, a bypass duct for the combustion gas channel connecting a first region thereof in which the denitrator is disposed with a second region upstream of the first region, control valve means disposed in the duct, and a temperature detector disposed in the first region and connected to the control valve means so as to control the opening and the closing of the valve means in response to the temperature detected in the first region by the detector.

Further in the prior art, U.S. Pat. No. 4,300,920, entitled "Stack Gas Reheater System" and which issued on Nov. 17, 1981, discloses a stack gas reheater system of the type where saturated flue gas is reheated in a reheat heat exchanger to prevent condensation in the stack and in the exhaust fan which conveys the flue gas to the stack. U.S. Pat. No. 4,300,920 further relates to a reheater system whereby further additional heat is added to the flue gas stream upstream of the reheat heat exchanger to prevent condensation in the reheat heat exchanger whose primary function is indicated above.

Still further, U.S. Pat. No. 4,310,498, entitled "Temperature Control For Dry $SO_2$ Scrubbing System" and which issued on Jan. 12, 1982, discloses an apparatus and method for removing sulfur oxides from a flue gas produced during the combustion of a sulfur bearing coal fossil fuel. Also, U.S. Pat. No. 4,310,498 relates to an apparatus and method for controlling the temperature of the flue gas entering a spray dryer absorption chamber in order to be sprayed into the flue gas thereby allowing the treatment of flue gas containing high levels of sulfur oxide and insuring higher sulfur removal efficiencies.

U.S. Pat. No. 4,705,101, entitled "Flue Gas Reheat Apparatus" and which issued on Nov. 10, 1987, discloses an invention that relates to flue gas scrubbing and reheating apparatus, and more particularly, to improved method and apparatus which provides important economic advantages.

U.S. Pat. No. 5,555,849, entitled "Gas Temperature Control System For Catalytic Reduction Of Nitrogen Oxide Emissions" and which issued on Sep. 16, 1996 to the same assignee as the present invention, relates to the catalytic reduction of nitrogen oxide emissions from fossil-fuel power plants and more particularly to the control of the flue gas temperature entering the catalytic reactor during low load operations.

However, the use of a bypass duct at low boiler loads, such as would be used in a fuel-fired steam generating power plant to reheat flue gases, offers fewer advantages than under other boiler load conditions. Diverting relatively hot flue gases to be mixed with relatively cool flue gases creates temperature differentials that give rise to thermal stresses in the backpass volume, the bypass duct and the gas duct leading to the SCR chamber. These thermal stresses are usually relieved by way of expansion joints. In addition, control dampers within the bypass duct are required in order to regulate the flow of the flue gas through the bypass duct. Furthermore, a slide gate is typically used to seal off the bypass duct when it is not in use. However, due to warpage caused by thermal expansion, and fouling due to the accumulation of fly ash entrained within the flue gas, the slide gate may not seal properly. This causes flue gas leakage when the slide gate is closed and is a source of the need to regularly replace seals. Still further, the use of a bypass duct to control the temperature of the flue gas entering the SCR chamber creates temperature gradients across the flue gas stream as it enters the SCR chamber. A more uniform temperature profile across the flue gas stream is required to allow for a more efficient use of the catalytic material in the Selective Catalytic Reduction process.

Current methods of steam generation in the thermodynamic steam cycle of a fuel-fired steam generating power plant may typically direct superheated steam from a primary superheater to a desuperheater and thereafter to a secondary superheater before being directed to a high pressure turbine for expansion therein. However, at various boiler loads, the temperature of the superheated steam directed to the high pressure turbine may be too high. In order to lower this temperature to an optimum value, water spray is added to the superheated steam, as needed, by a desuperheater. Such spray desuperheating usually occurs before the secondary superheater and represents a loss in useful energy to the thermodynamic steam cycle.

SUMMARY OF THE INVENTION

The present invention proposes to offer an alternative approach to the known approach of reheating flue gases by a bypass duct—namely, the present invention provides an approach that includes eliminating the bypass duct and instead reheating the flue gas stream to a temperature sufficient for effective Selective Catalytic Reduction, while the steam generating power plant is being operated at low boiler loads. In accordance with the present invention, it is proposed that a portion of this lost energy be used to benefit another process in the thermodynamic steam cycle. For example, in accordance with the present invention, a portion of this otherwise lost energy can be used to raise the temperature of the flue gas stream to at least the minimum temperature required for effective Selective Catalytic Reduction by way of diverting a quantity of superheated steam from the aforesaid desuperheater, to a heat exchanger located in the flue gas stream upstream of the point at which the reactant is introduced into the flue gas stream, thence returning the quantity of superheated steam to a location upstream of the desuperheater.

It is therefore an object of the present invention to provide a new and improved method of reheating the flue gas generated in a fossil-fuel fired steam generating power plant prior to the flue gas entering a Selective Catalytic Reduction chamber.

It is also an object of the present invention to provide such a new and improved method of reheating the flue gas generated in a fossil-fuel fired steam generating power plant whereby thermal stresses in the backpass are reduced.

It is still further an object of the present invention to provide such a new and improved method of reheating the flue gas generated in a fossil-fuel fired steam generating power plant whereby slide gates and the attendant problems of fouling, warpage and the need for control dampers is eliminated.

It is yet further an object of the present invention to provide such a new and improved method of reheating the flue gas generated in a fossil-fuel fired steam generating power plant whereby a portion of energy lost to the associated thermodynamic steam cycle due to desuperheating is utilized to reheat the flue gas.

In accordance with the present invention there is provided a method of controlling the temperature of the flue gas entering a Selective Catalytic Reduction chamber of a fossil-fuel fired steam generating power plant. The fossil-fuel fired steam generating power plant embodies a furnace volume, a backpass volume in fluid communication therewith via a horizontal pass, a Selective Catalytic Reduction chamber in fluid communication with the backpass volume via flue gas ductwork. The fossil-fuel fired steam generator is operative to generate steam therewithin in accordance with a preselected thermodynamic steam cycle. The steam is intended to be supplied to a high pressure turbine and/or an intermediate pressure turbine and a low pressure turbine for expansion therein. The mode of operation of the aforereferenced fossil-fuel fired steam generator is such that the generation of steam commences in the lower segment of the furnace volume where fuel and air are mixed and subject to combustion. As a consequence of the combustion, hot gases, commonly referred to as flue gases, are produced thereby, and rise within the furnace volume giving up heat to the working fluid of the thermodynamic steam cycle. The working fluid of the thermodynamic steam cycle is most commonly water and is present within waterwall tubes that serve to define the furnace volume. Steam is produced from the water evaporation as a result of the heat transfer from the flue gases to the water. Upon reaching the upper segment of the furnace volume the flue gases are made to flow to a backpass volume by way of a horizontal pass. The flue gases are then directed through the backpass volume where they perform yet further heat transfer duty in accordance with the preselected thermodynamic steam cycle. More specifically, that heat transfer duty performed in the backpass volume is first in the nature of superheating the aforereferenced steam which has been produced in the waterwalls of the furnace volume, separated in a steam drum or other pressure vessel and which, in accordance with the thermodynamic steam cycle, has been directed to additional heat transfer surface within the backpass volume; and second in the nature of heating feedwater for further use in the thermodynamic steam cycle. In addition to that portion of the heat transfer duty performed in the backpass volume, the remainder of the heat transfer duty that is required to complete the thermodynamic steam cycle is accomplished in the furnace volume of the steam generator. To this end, the furnace volume of the steam generator may or may not embody additional superheat and/or reheat surface depending upon the specific nature of the thermodynamic steam cycle. In accordance with the thermodynamic steam cycle the superheated steam is directed to a high pressure turbine and/or an intermediate pressure turbine and a low pressure turbine which in known fashion are coupled to a generator for the purpose of generating electricity.

Continuing, the flue gases, after passing through the backpass volume, are directed via ductwork to a Selective Catalytic Reduction chamber for $NO_x$ reduction and thence to an air preheater and to further flue gas cleaning systems thence to the atmosphere via a stack.

In accordance with a first aspect of the present invention there is provided a method controlling the temperature of the flue gas entering the Selective Catalytic Reduction chamber wherein relatively hot superheated steam, emanating from a first primary superheater disposed within the backpass volume, is directed first to a flue gas heat exchanger to reheat a relatively cool flue gas, thence to a location upstream of a desuperheater, thence to further superheat and/or reheat surface and finally to a turbine for expansion therein.

In accordance with a second aspect of the present invention, there is provided a method controlling the temperature of the flue gas entering the Selective Catalytic Reduction chamber wherein relatively hot superheated steam, emanating from a second primary superheater disposed within the furnace volume, is directed to a flue gas heat exchanger to reheat a relatively cool flue gas, thence to a location upstream of a desuperheater, thence to further superheat and/or reheat surface and finally to a turbine for expansion therein.

DESCRIPTION OF THE PREFERRED EMBODIMENT

Figure 1:
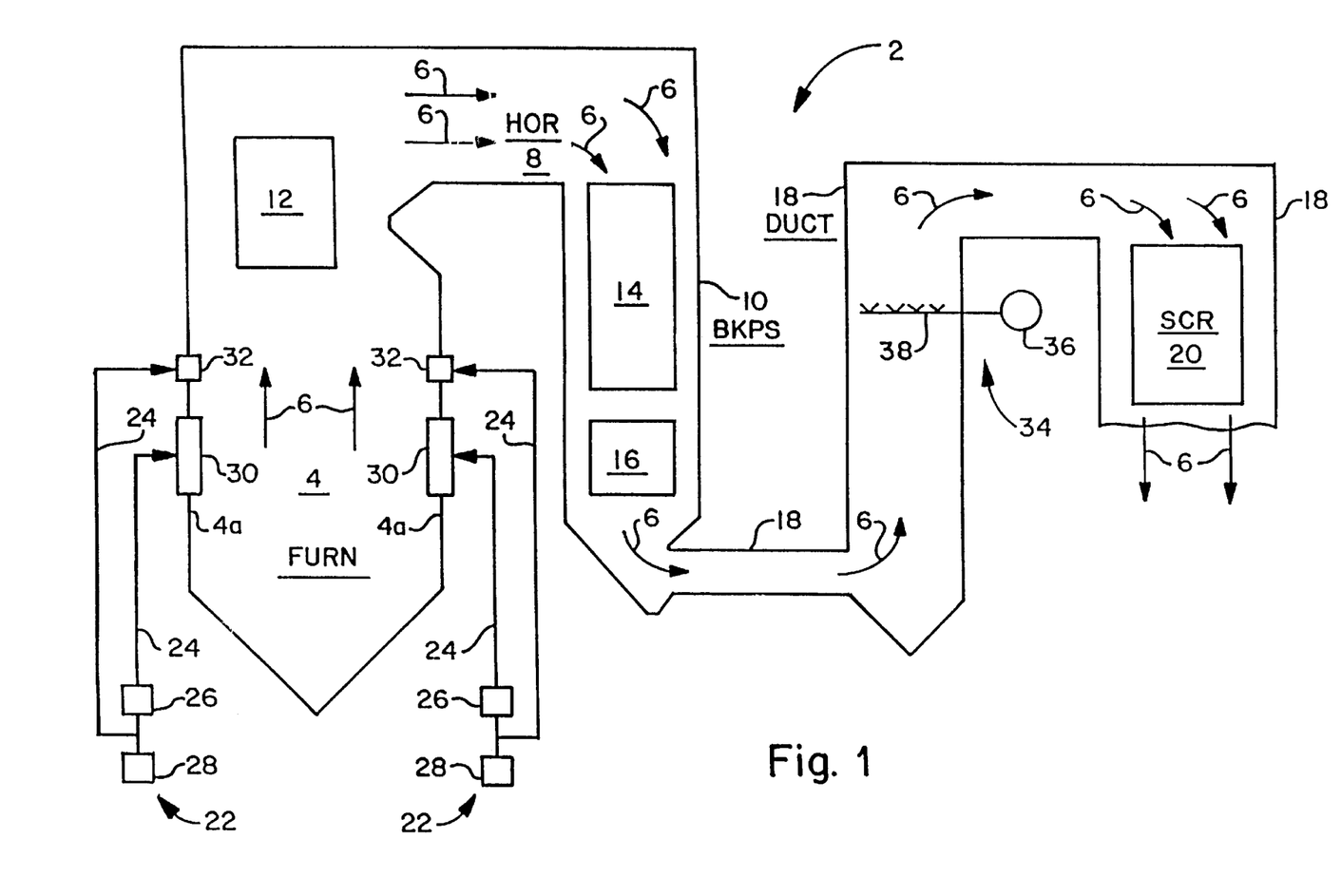
FIG. 1 is a schematic representation in the nature of a side elevation view of a fuel-fired steam generating power plant including a fuel/air firing system, a furnace volume, a horizontal pass, a backpass volume, a Selective Catalytic Reduction chamber, interconnecting ductwork and heat transfer surfaces, constructed in accordance with the present invention.

Referring now to FIG. 1 there is depicted a generalized schematic diagram in the nature of a side elevation view of a fossil-fuel fired furnace of a steam generating power plant, generally designated by reference numeral 2. Inasmuch as the nature of the construction and mode of operation of fossil-fuel fired furnaces are well known to those skilled in the art, it is deemed not necessary to set forth a detailed description of the fossil-fuel fired furnace 2. Rather, for purposes of obtaining an understanding of the fossil-fuel fired furnace 2, it is deemed to be sufficient that there be presented herein merely a description of the nature of the components of the fossil-fuel fired furnace 2 with which the present invention cooperates. For a more detailed description of the nature of the construction and the mode of operation of a fossil-fuel fired furnace such as the fossil-fuel fired furnace 2, one may reference U.S. Pat. No. 4,719,587, which issued on Jan. 12, 1987 to F. J. Berte and which is assigned to the same assignee as the present patent application.

Referring further to FIG. 1, the fossil-fuel fired furnace 2 includes a furnace volume (FURN), generally designated by reference numeral 4. It is within the furnace volume 4 of the fossil-fuel fired furnace 2 that, in a manner well known to those skilled in the art, combustion of fuel and air is initiated. The hot gases that are produced from this combustion, commonly referred to as flue gases 6 and which may act as a heat exchange medium, rise upwardly within the furnace volume 4 and give up heat to the working fluid of a thermodynamic steam cycle. The working fluid passes through the furnace waterwall tubes 4a which in a conventional manner line all four walls of the furnace volume 4. The flue gases 6 then exit the furnace volume 4 through a horizontal pass (HOR), generally designated by reference numeral 8. The horizontal pass 8 in turn leads to a backpass volume (BKPS), generally designated by reference numeral 10. The upper segment of the furnace volume 4 as well as the horizontal pass 8 and the backpass volume 10 commonly contain other heat exchange surfaces 12, 14, 16 for superheating and reheating steam or heating feedwater in a manner well known to those skilled in the art. Thereafter, the steam generated in the thermodynamic steam cycle commonly is made to flow to a turbine (not shown), which forms one component of a turbine/generator set (not shown). The steam provides the motive power to drive the turbine which thence drives the generator. The generator is, in known fashion, cooperatively associated with the turbine such that electricity is produced thereby. With further reference to FIG. 1, the aforesaid flue gases 6, after passing through the backpass volume 10 and giving up heat to the heat exchange surfaces 14, 16 therein, are directed via flue gas ductwork (DUCT) 18 through a Selective Catalytic Reduction chamber (SCR) 20 and thence to an air preheater (not shown), flue gas cleaning systems (not shown), a stack (not shown) and are then vented to the atmosphere.

Referring further to FIG. 1 there is also depicted a schematic representation of a means, generally designated by the numeral 22, for supplying fuel and air to the furnace volume 4. The fuel and air supply means 22 consists of various ducts 24 so designed and constructed as to transport fuel and air, separately or if need be in combination, from a fuel source 26 and an air source 28 to a main windbox 30 thence therethrough to the furnace volume 4. The air may also be directed to a set of separated overfire air (SOFA) windboxes 32, and thence therethrough to the furnace volume 4 so as to complete the aforesaid combustion. For a more detailed description of the nature of construction and the mode of operation of the fuel and air supply means, one may reference U.S. Pat. No. 5,315,939, which issued on May 31, 1994 to M. Rini et al. and which is assigned to the same assignee as the present patent application.

Continuing further in FIG. 1 there is also depicted a schematic representation of a means, generally designated by the reference numeral 34, for supplying a reactant to the flue gases 6 flowing through the flue gas ductwork 18. The reactant supply means 34 includes a reactant source 36 and a reactant grid 38 so designed and constructed, in combination, as to transport the reactant from the reactant source 36 to the flue gases 6 for mixture therewith. The flue gas/reactant mixture then flows to the Selective Catalytic Reduction chamber 20 wherein it undergoes Selective Catalytic Reduction.

Figure 2:
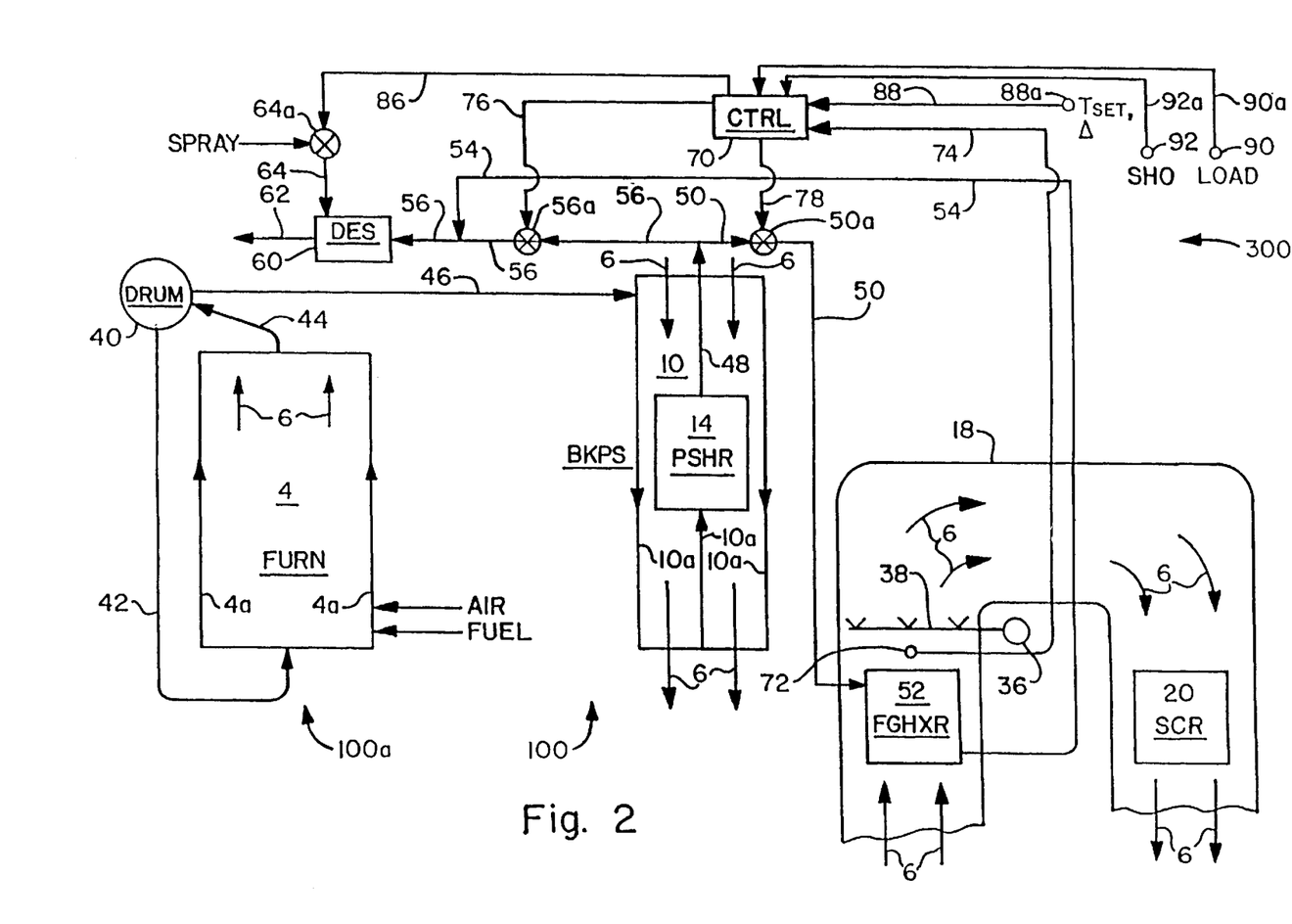
FIG. 2 is a simplified schematic representation of a segment of the fluid circuitry of a first thermodynamic steam cycle integrated with a flue gas flow path and control system employable with a fuel-fired steam generating power plant such as the fuel-fired steam generating power plant of FIG. 1, constructed in accordance with the present invention.

In accordance with a first aspect of the present invention reference will now be had to FIG. 2 which depicts, by way of exemplification and not limitation, a simplified schematic representation of a segment of the fluid circuitry 100 of a first thermodynamic steam cycle. A thermodynamic steam cycle with which such a segment of fluid circuitry is often associated is commonly referred to as a "subcritical" steam cycle. FIG. 2 also depicts the integration of the fluid circuitry 100 with the flow path of the aforementioned flue gases 6, and further depicts a control system, generally designated by the reference numeral 300 operative to control the flow of superheated steam from a first primary superheater 14 to either a spray desuperheater 60 (DES) or a flue gas heat exchanger 52 (FGHXR). For the purposes of the description of the aforementioned fluid circuitry 100, it is deemed sufficient, to those skilled in the art, to note that the fluid circuitry 100 encompasses a multiplicity of downcomers, risers, tubes, headers, piping, links and other conduits through which water and steam are made to flow as necessary in accordance with the requirements of the first thermodynamic steam cycle.

With further reference to FIG. 2, the fluid circuitry 100 of the first thermodynamic steam cycle is comprised of a circulatory fluid flow path generally denoted therein by the reference numeral 100a. The circulatory flow path 100a is designed to be operative as an evaporative steam loop, denoted in FIG. 2 by the reference numerals 40, 42, 4a, 44, 40. The evaporative steam loop 40, 42, 4a, 44, 40 becomes operative as a result of the combustion process, which takes place within the furnace volume 4. As has been noted hereinabove, as the flue gases 6 rise within the furnace volume 4, heat is transferred therefrom to the waterwall tubes 4a which serve to define the furnace volume 4. As a consequence thereof, saturated water, which enters the waterwall tubes 4a from the steam drum (DRUM) 40 via a downcomer 42, is evaporatively changed to a mixture of saturated water and "wet" steam as the saturated water rises within the waterwall tubes 4a. Thereafter, the mixture of saturated water and "wet" steam is made to flow to the steam drum 40 for separation therein. Upon separation, the saturated water is once again made to flow to the lower segment of the waterwall tubes 4a via the downcomer 42, while saturated or slightly superheated steam is made to flow to the backpass volume 10 via a piping link 46 and a common header (not shown in the interest of clarity). The saturated or slightly superheated steam is thence made to flow through a series of backpass tubes 10a to a first primary superheater (PSHR) 14 disposed within the backpass volume 10. As the superheated steam flows through the first primary superheater 14, an exchange of heat takes place between the relatively hot flue gases 6 flowing through the backpass volume 10 and the aforesaid steam. As a result of the exchange of heat the superheated steam is increasing in temperature. The superheated steam is then made to flow, depending upon boiler load conditions and/or the flue gas temperature entering the Selective Catalytic Reduction chamber 20, from the first primary superheater 14 to either the flue gas heat exchanger 52, disposed within the flue gas ductwork 18, or to the spray desuperheater 60 and thence to a secondary superheater (not shown).

Figure 3:
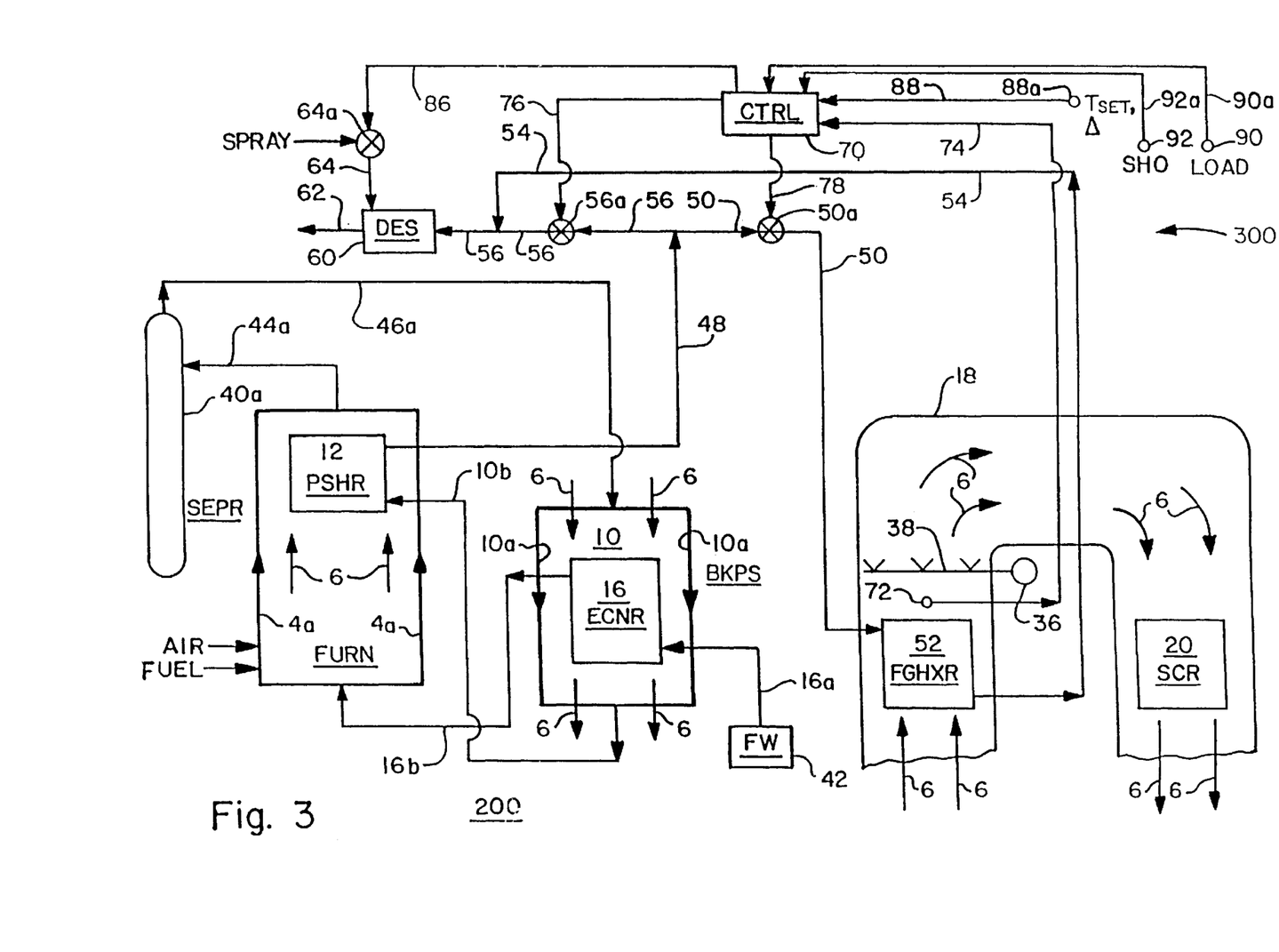
FIG. 3 is a simplified schematic representation of a segment of the fluid circuitry of a second thermodynamic steam cycle integrated with a flue gas flow path and control system employable with a fuel-fired steam generating power plant such as the fuel-fired steam generating power plant of FIG. 1, constructed in accordance with the present invention.

In accordance with a second aspect of the present invention reference will now be had to FIG. 3 of the drawing. FIG. 3 depicts, by way of exemplification and not limitation, a simplified schematic representation of a segment of the fluid circuitry 200 of a second thermodynamic steam cycle. A thermodynamic steam cycle with which such a segment of fluid circuitry is often associated is commonly referred to as a "supercritical" steam cycle. FIG. 3 also depicts the integration of the fluid circuitry 200 with the flow path of the aforementioned flue gases 6, and further depicts the preferred embodiment of the control system 300 of the present invention which is operative to control the flow of superheated steam from a second primary superheater 12 to either a spray desuperheater (DES) 60 or a flue gas heat exchanger (FGHXR) 52. For the purposes of the description of the aforementioned fluid circuitry 200, it is again deemed sufficient, to those skilled in the art, to note that the fluid circuitry 200 encompasses a multiplicity of downcomers, risers, tubes, headers, piping, links and other conduits through which water and steam are made to flow as necessary in accordance with the requirements of the second thermodynamic steam cycle.

With further reference to FIG. 3, the second thermodynamic steam cycle begins with a feedwater supply means (FW) 42. Feedwater, at a first temperature, is made to flow therefrom via a piping link 16a to an economizer (ECNR) 16 disposed within the backpass volume (BKPS) 10. The feedwater is further made to flow through the economizer 16. As the feedwater flows through the economizer 16, an exchange of heat takes place between the relatively hot flue gases 6 flowing through the backpass volume 10 and the aforesaid feedwater. As a result of the exchange of heat the feedwater is brought to a second, higher, temperature. The feedwater is now made to flow via a piping link 16b to the lower segment of the furnace volume (FURN) 4. As has been noted above, as the flue gases 6 rise within the furnace volume 4, heat is transferred therefrom to the waterwall tubes 4a which serve to define the furnace volume 4. As a consequence thereof, if the steam generator is being operated at above "low load" conditions, the feedwater is changed to superheated steam as the water rises within the waterwall tubes 4a. Thereafter, the superheated steam is made to flow to a separator (SEPR) 40a via a piping link 44a and thence to the backpass volume 10 via a piping link 46a. In contradistinction, if the steam generator is being operated under "low load" subcritical conditions, the water is evaporatively changed to a mixture of saturated water and "wet" steam as the water rises within the waterwall tubes 4a. Thereafter, the mixture of saturated water and "wet" steam is made to flow to the separator 40a via a piping link 44a for separation therein. Upon separation, the saturated water is once again made to flow to the lower segment of the waterwall tubes 4a via a downcomer (not shown), while saturated steam is made to flow to the backpass volume 10 via the piping link 46a and a common header (not shown). In either case, the superheated or saturated steam is made to flow through the backpass tubes 10a wherein further superheating of the steam is accomplished. The now superheated steam is thence made to flow, via piping link 10b, to a second primary superheater (PSHR) 12 disposed within the upper segment of the furnace volume 4. As the superheated steam flows through the second primary superheater 12, an exchange of heat takes place between the relatively hot flue gases 6 flowing through the furnace volume 4 and the aforesaid superheated steam. As a result of the exchange of heat the superheated steam is further superheated. The superheated steam is then made to flow, depending upon boiler operating conditions, from the second primary superheater 12 to either a flue gas heat exchanger (FGHXR) 52 or a spray desuperheater (DES) 60 and thence to a secondary superheater (not shown). A minimum amount of spray flow through the desuperheater 60 is maintained in order to control superheated steam outlet (SHO) temperature.

Figure 4:
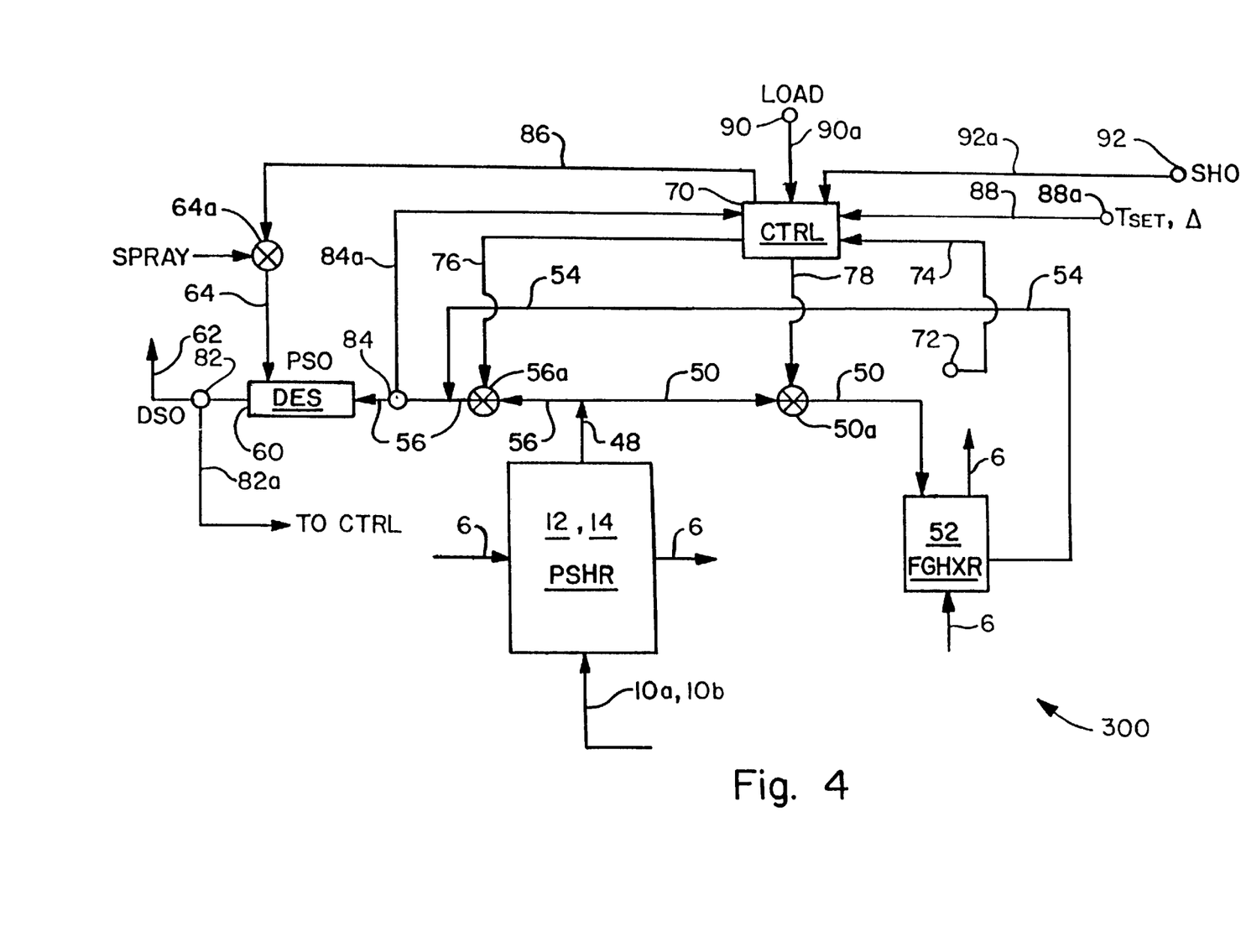
FIG. 4 is simplified schematic representation of the generalized fluid circuitry of one embodiment of the present invention integrated with a control system employable with a fuel-fired steam generating power plant such as the fuel-fired steam generating power plant of FIG. 1, constructed in accordance with the present invention.

In further explanation of the first and second aspects of the present invention, specific reference is now made to FIG. 4 which is a simplified schematic representation of the fluid circuitry of the first and second aspects of the present invention divorced from the background of the fluid circuitry of the first thermodynamic steam cycle of FIG. 2 and the second thermodynamic steam cycle of FIG. 3. As seen in FIG. 4, the fluid circuitry of the first and second aspects of the present invention includes a primary superheater (PSHR) 12, 14, a first conduit branch 56, a second conduit branch 50, first means 48 for conveying superheated steam from the primary superheater 12, 14 to either the first conduit branch 56 or the second conduit branch 50, a flue gas heat exchanger (FGHXR) 52 disposed in the flue gas ductwork 18 (not shown in FIG. 4), a third conduit branch 54 for conveying superheated steam from the flue gas heat exchanger 52 to the first conduit branch 56, a spray desuperheater (DES) 60 operatively connected to the first conduit branch 56, means 62 for conveying desuperheated steam from the desuperheater 60 to additional superheat surface (not shown), spray conveying means 64 operatively connected to the desuperheater 60 and a desuperheater valve 64a operatively connected to the spray conveying means 64. In addition, the fluid circuitry of the first and second aspects of the present invention also includes a first control valve 56a operatively connected to the first conduit branch 56 and a second control valve 50a operatively connected to the second conduit branch 50. Furthermore, the first and second aspects of the present invention include a control system 300 comprising a controller (CTRL) 70, a flue gas temperature sensor 72 disposed within the flue gas ductwork 18 downstream of the flue gas heat exchanger 52, means 74, operatively connected to the flue gas temperature sensor 72, for conveying a signal indicative of the temperature of the flue gases 6 downstream of the flue gas heat exchanger 52 to the controller 70, desuperheated steam outlet (DSO) temperature sensor 82 disposed on the desuperheated steam conveying means 62, means 82a, operatively connected thereto, for conveying a signal indicative of the desuperheated steam outlet temperature to the controller 70, primary superheated steam outlet (PSO) temperature sensor 84 disposed on the first conduit branch 56, means 84a operatively connected thereto for conveying a signal indicative of the primary superheated steam outlet temperature to the controller 70, first means 76 for conveying a first valve command signal to the first control valve 56a, second means 78 for conveying a second valve command signal to the second control valve 50a, third means 86 for conveying a desuperheater command signal to the desuperheater valve 64a, thermostatic control means 88a for preselecting a first temperature and a second temperature, means 88 operatively connected thereto for conveying a signal indicative of the first preselected and second preselected temperatures to the controller 70, boiler load sensor (LOAD) 90, means 90a operatively connected thereto for conveying a signal indicative of the boiler load to the controller 70, a superheated steam outlet (SHO) temperature sensor 92, means 92a, operatively connected thereto for conveying a signal indicative of the superheated steam outlet temperature to the controller 70.

As best understood with respect to the controller 70 of FIG. 4, such a controller may be any conventional controller including means, such as software or any programmable logic scheme, whereby the method of the present invention is carried out.

With further reference to FIG. 4 with the description of the fluid circuitry of the first and second aspects of the present invention, superheated steam is made to flow, depending upon boiler load conditions and the temperature of the flue gases 6 in the flue gas ductwork 18 (as discussed with respect to FIG. 3), from the primary superheater 12, 14, via the superheated steam conveying means 48 and the first conduit branch 56, to the spray desuperheater 60 or, via the first superheated steam conveying means 48 and the second conduit branch 50, to the flue gas heat exchanger 52 and thence to the first conduit branch 56 via the third conduit branch 54.

Figure 6:
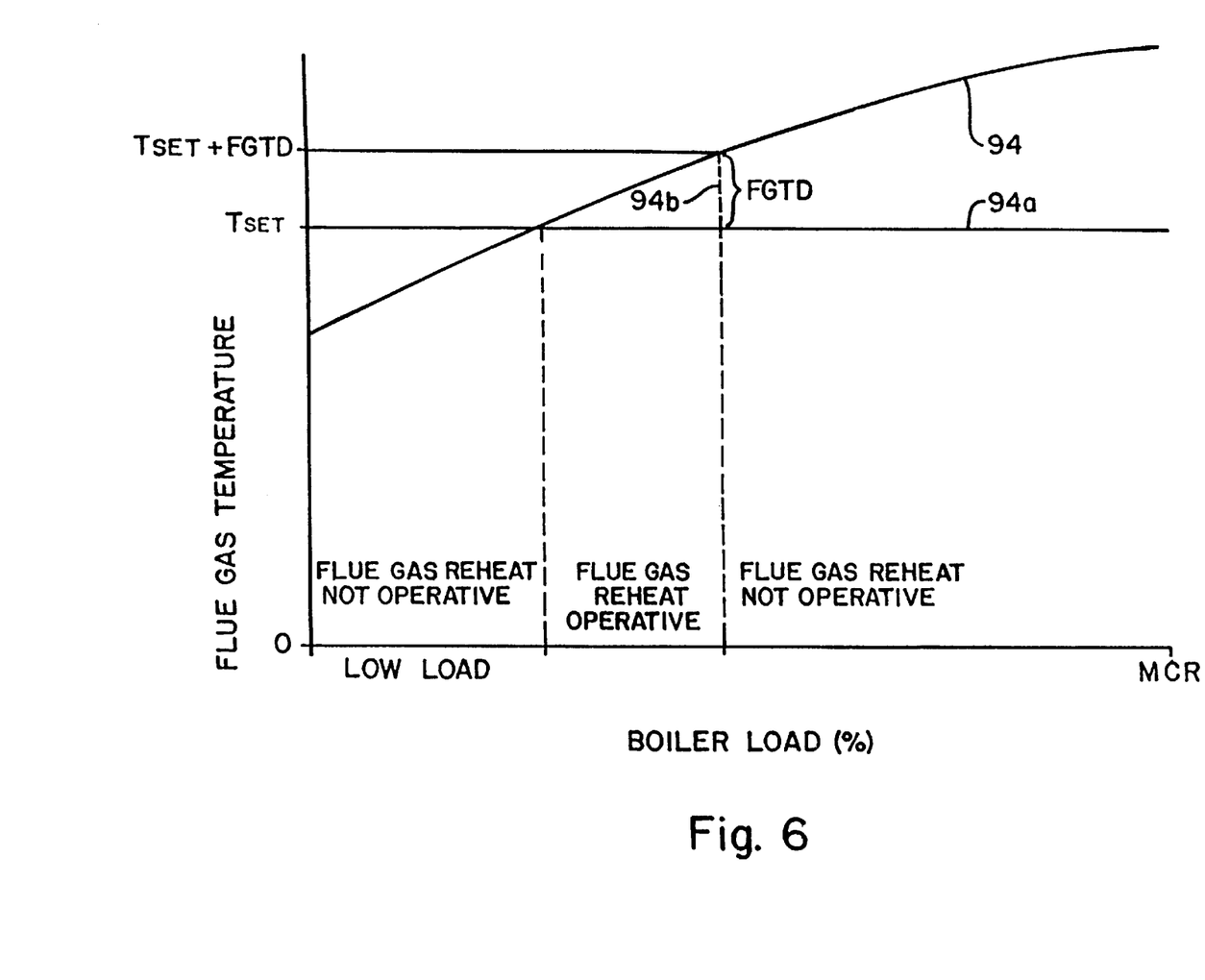
FIG. 6 is a graphical representation of the temperature of the flue gas in the flue gas ductwork entering the Selective Catalytic Reduction chamber as a function of boiler load.
Figure 7:
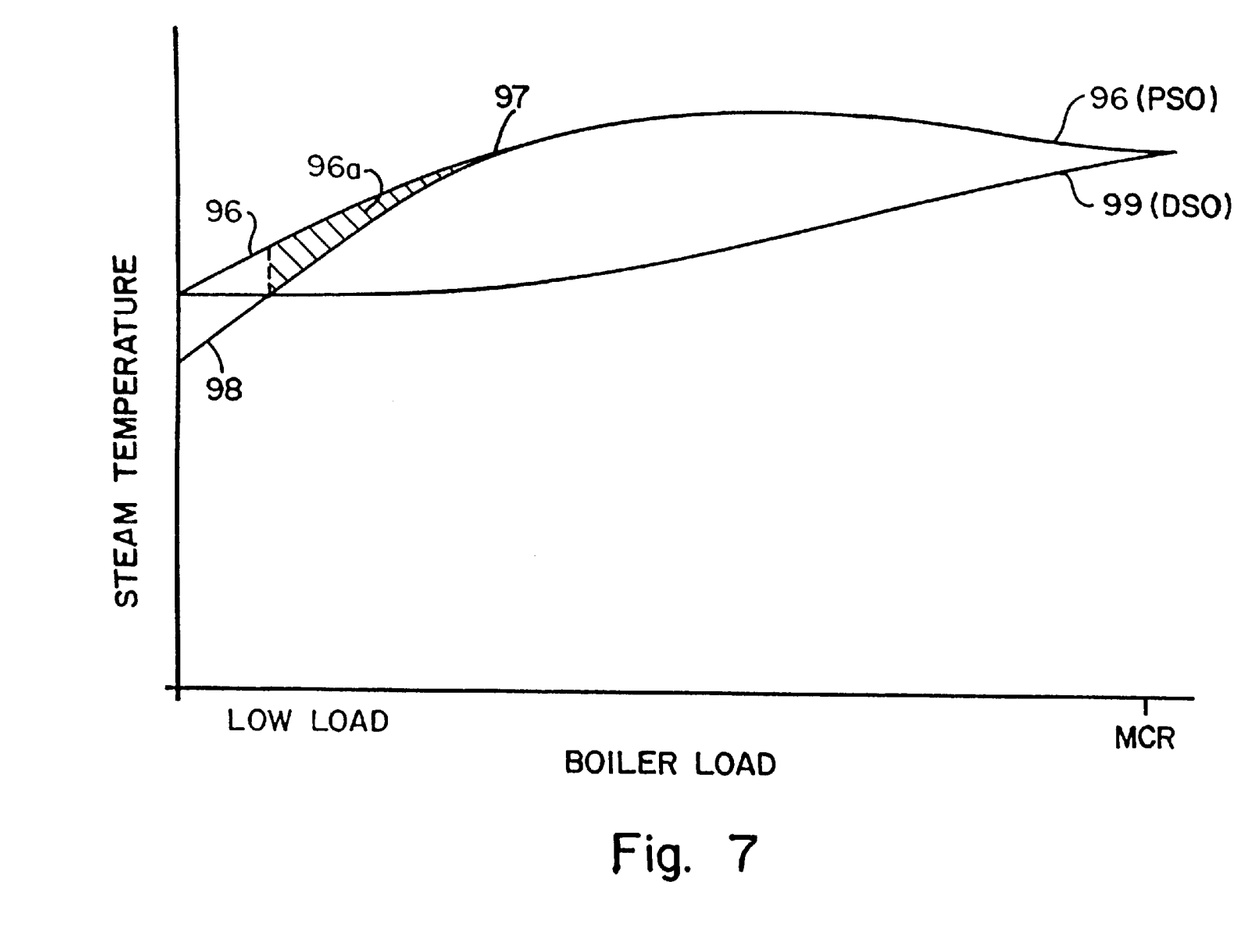
FIG. 7 is a graphical representation of the temperature of the steam leaving the primary superheater without the benefit of the present invention, the temperature of the steam leaving the primary superheater with the benefit of the present invention, and the temperature of the steam leaving the desuperheater each as a function of boiler load.

The flue gas temperature and boiler load conditions that govern the operative nature of the first and second aspects of the present invention will be more fully specified with reference to FIG. 6 and FIG. 7. FIG. 6 is a graphical depiction of the flue gas temperature, on the ordinate, as a function of the boiler load (represented as a percentage), on the abscissa, and showing a plot 94 of the actual flue gas temperature and a plot 94a of the minimum required flue gas temperature $T_{set}$ necessary to support or maintain effective Selective Catalytic Reduction in the SCR chamber 20. The minimum required flue gas temperature $T_{set}$ is a predetermined value dependent upon, for instance, the type of fuel used in the combustion process and/or the type of catalyst used in the reduction process in the SCR chamber 20 and representing a minimum acceptable temperature below which it is desired not to allow the flue gas temperature to fall when the boiler is fully operational and reactant is being injected into the flue gases 6. A measure of the difference between the actual flue gas temperature and the minimum required flue gas temperature $T_{set}$ at an arbitrarily chosen boiler load is graphically represented by a differential plot 94b extending parallel to the ordinate between the plot 94 of the actual flue gas temperature and the plot 94a of the minimum required flue gas temperature $T_{set}$, and this difference in the temperature values is designated as a predetermined flue gas temperature differential FGTD. The flue gas temperature differential FGTD is a predetermined value dependent upon, for instance, the load range over which a constant superheated steam outlet temperature may be maintained, the amount of desuperheating necessary and the amount of $SO_3$ in the flue gas.

Figure 5:
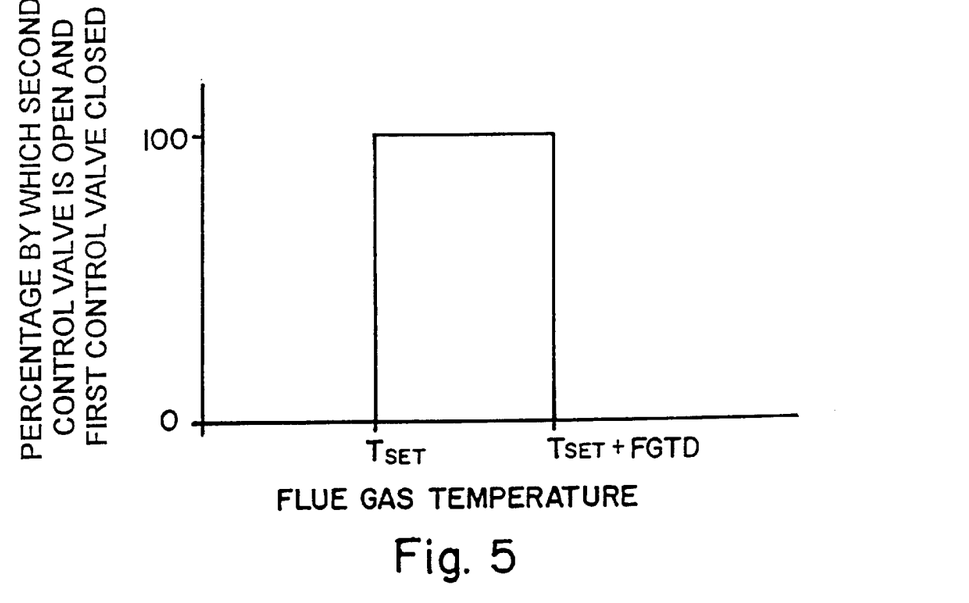
FIG. 5 is a graphical representation of the percentage by which the second control valve is open and the first control valve is closed as a function of flue gas temperature.
Figure 5A:
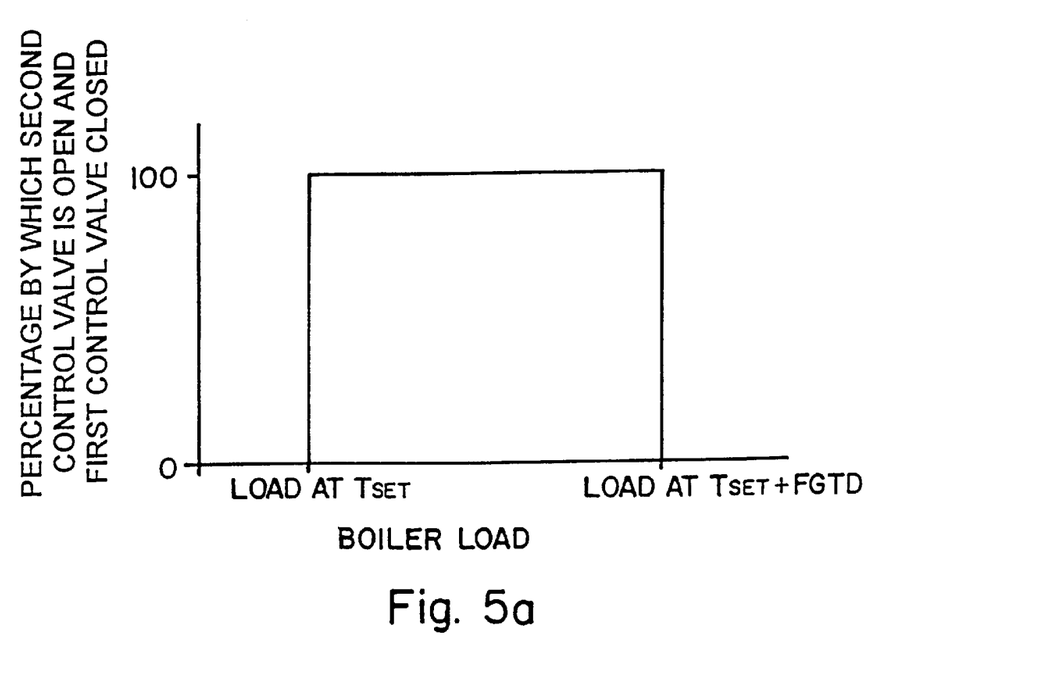
FIG. 5a is a graphical representation of the percentage by which the second control valve is open and the first control valve is closed as a function of boiler load.

Reference is now made to FIG. 5 which is a graphical representation of the percentage by which the second control valve 50a is open and the first control valve 56a is closed as a function of flue gas temperature and to FIG. 5a which is a graphical representation of the percentage by which the second control valve 50a is open and the first control valve 56a is closed as a function of boiler load. With reference to FIG. 6, if the boiler is being operated at a load whereby the temperature of the flue gas in the flue gas ductwork 18 is above $[T_{set}+FGTD]$, the sum of the minimum required flue gas temperature $T_{set}$ and the predetermined flue gas temperature differential FGTD, the superheated steam diversion aspect of the control method implemented by the control system 300 of the present invention is, in accordance with the method of the present invention, not implemented. Specifically, in response to the second valve command signal from the controller 70, and as graphically depicted in FIG. 5 and FIG. 5a, the second control valve 50a is closed, and, in response to the first valve command signal from the controller 70, the first control valve 56a is opened. Thus, under such operating conditions, superheated steam is directed, via the first superheated steam conveying means 48 and the first conduit branch 56, from the primary superheater 12, 14 to the spray desuperheater 60 and thence to a secondary superheater (not shown) for continued use in the first or second thermodynamic steam cycles, as the case may be.

When the boiler is being operated in a load range whereby the temperature of the flue gas in the flue gas ductwork 18 is below a temperature $[T_{set}+FGTD]$, the sum of the minimum required flue gas temperature $T_{set}$ and the predetermined flue gas temperature differential FGTD, and above the minimum required flue gas temperature $T_{set}$, the superheated steam diversion aspect of the method of the present invention is implemented by the control system 300. Specifically, in response to the second valve command signal from the controller 70, the second control valve 50a is opened, and, in response to the first valve command signal, the first control valve 56a is closed. Thus, under such operating conditions, superheated steam is directed, via the first superheated steam conveying means 48 and the second conduit branch 50, to the flue gas heat exchanger 52. As a consequence thereof, an exchange of heat takes place between the relatively hotter superheated steam directed to the flue gas heat exchanger 52 and the relatively cooler flue gases 6 flowing through the flue gas ductwork 18. Thus, the flue gases 6, whose temperature has been increased by the heat exchange with the superheated steam, are suitable for further processing, i.e., the temperature of the flue gases 6 entering the Selective Catalytic Reduction chamber 20 are maintained in a temperature range between the minimum required flue gas temperature $T_{set}$ and a temperature $[T_{set}+FGTD]$, the sum of the minimum required flue gas temperature $T_{set}$ and the predetermined flue gas temperature differential FGTD. After the exchange of heat in the flue gas heat exchanger 52, the now slightly cooler, though still superheated steam, is then directed from the flue gas heat exchanger 52 to the spray desuperheater 60 via the third conduit branch 54 and the first conduit branch 56 thence to a secondary superheater (not shown) for continued use in the first or second thermodynamic steam cycles, as the case may be.

With continued reference to FIG. 6, if the boiler is being operated at a load whereby the temperature of the flue gas in the flue gas ductwork 18 is below the minimum required flue gas temperature $T_{set}$, the second control valve 50a, in response to the second valve command signal from the controller 70, is closed, and, in response to the first valve command signal from the controller 70, the first control valve 56a is opened. Thus, under such operating conditions, superheated steam is directed, via the superheated steam conveying means 48 and the first conduit branch 56, from the primary superheater 12, 14 to the spray desuperheater 60 and thence to a secondary superheater (not shown) for continued use in the first or second thermodynamic steam cycles, as the case may be.

FIG. 7 is a graphical representation of the temperature of the steam leaving the primary superheater 12, 14 without the present invention operative (PSO), as designated by a plot 96, the temperature of the steam leaving the primary superheater 12, 14 with the present invention operative in a low load regime, as designated by a plot 98, and the temperature of the steam leaving the desuperheater 60, as designated by a plot 99, individually as a function of boiler load. As the boiler load decreases from, for example, the maximum continuous rating (MCR) of the boiler, and enters a "low load" regime, the temperature of the flue gases 6 in the flue gas ductwork 18 drops below temperature $[T_{set}+FGTD]$, the sum of the minimum required flue gas temperature $T_{set}$ and the predetermined flue gas temperature differential FGTD, as seen in FIG. 6, and the method of the present invention is implemented as previously discussed with respect to FIG. 5 and FIG. 5a. The influence of the method of the present invention in recuperating otherwise lost energy during operation of the boiler in a low load regime is graphically depicted in FIG. 7 by the departure of the temperature of the steam leaving the primary superheater 12, 14 without the present invention operative (PSO), as designated by the plot 96, from the temperature of the steam leaving the primary superheater 12, 14 with the present invention operative in a low load regime, as designated by the plot 98, at a departure point 97. With the steam diversion aspect of the method of the present invention inoperative, the area between the temperature of the steam (PSO) leaving the primary superheater 12, 14 (i.e., the primary superheated steam outlet temperature) depicted by the plot 96 and the temperature of the steam (DSO) 99 leaving the desuperheater 60 (i.e., the desuperheated steam outlet temperature) depicted by the plot 99 represents the total amount of desuperheating necessary to maintain an optimum superheated steam outlet (SHO) temperature over the operating range of the boiler. This area represents lost energy to the associated thermodynamic steam cycle and is indicative of thermodynamic inefficiency. However, as seen in FIG. 7, when the steam diversion aspect of the method of the present invention is operative in a "low load" regime, an area 96a between the temperature of the steam (PSO) leaving the primary superheater 12, 14 (i.e., the primary superheated steam outlet temperature) depicted by the plot 96 and the temperature of the steam (DSO) 99 leaving the desuperheater 60 (i.e., the desuperheated steam outlet temperature) depicted by the plot 98, shown in cross-hatching in FIG. 7, represents a reduction in the amount of desuperheating that is necessary to maintain the superheated steam outlet (SHO) temperature and thus represents a reduction in the amount of lost energy to the associated thermodynamic steam cycle. It is this reduction in lost energy, as represented by the area 96a, that is put to use in further processing the flue gases 6, i.e., by reheating the flue gases 6 in the flue gas ductwork 18 at the flue gas heat exchanger 52. It should also be understood with reference to FIG. 7 and FIG. 4 that, as required, the desuperheat control valve 64a is actuated by a desuperheat command signal from the controller 70 so as to allow the flow of spray to the desuperheater 60, thereby maintaining the superheated steam outlet (SHO) temperature.

Figure 8:
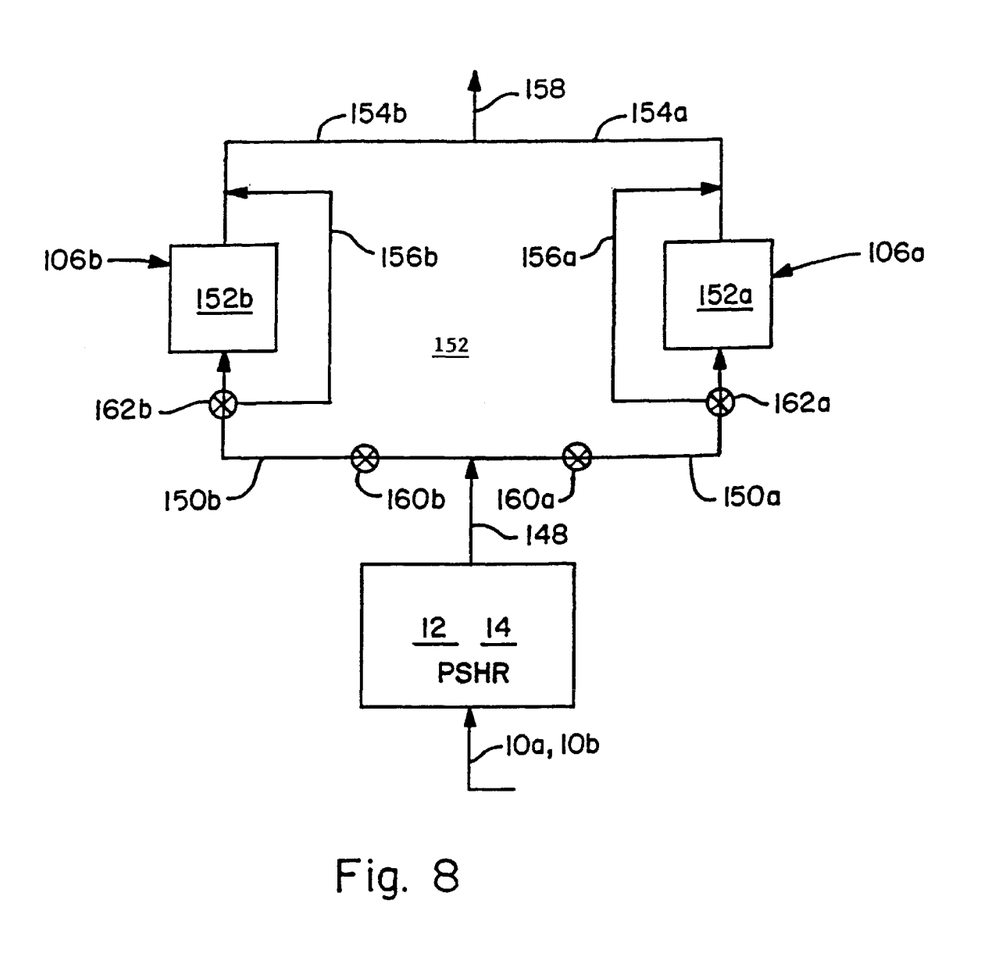
FIG. 8 is a generalized schematic representation of the fluid circuitry of one embodiment of the present invention employable with a fuel-fired steam generating power plant such as the fuel-fired steam generating power plant of FIG. 1, constructed in accordance with the present invention.

Reference is now made to FIG. 8, which is a generalized schematic representation of the fluid circuitry of a third aspect of the present invention including a plurality of heat exchange means 152, 152a in a parallel fluid flow relation thereamongst and in further fluid flow relation with the primary superheater 12, 14 and additional componentry of the thermodynamic steam cycle (not shown). The third aspect of the present invention includes a valve and pipe arrangement operatively connected to the control system 300 of FIG. 4 (not shown in FIG. 8 in the interest of clarity) so as to be capable of selectively branching steam in a steam conveying means 148 connected to the primary superheater 12, 14 into the pair of parallel heat exchange means 152a, 152b. The branched steam flows, respectively, through a branch control valve 160a, 160b along a branch entry pipe 150a, 150b and thereafter through a diverter valve 162a, 162b at which the steam is selectively diverted around the respective heat exchanger 152a, 152b along a diverting pipe 156a, 156b or is routed through the respective heat exchanger 152a, 152b for heat exchange thereat with a heat exchange medium such as, for example, the flue gas 106a, 106b. Subsequently, the branched steam is conveyed along a branch exit pipe 154a, 154b, respectively, to a common outlet pipe 158 at which the branched steam is recombined for subsequent delivery to a location for further processing thereof such as, for example, a secondary superheater or a turbine. If desired, one of the branch control valves 160a, 160b can be controlled to a more closed position so as to prevent steam flow therethrough, whereby all of the steam conveyed by the steam conveying means 148 is branched through the other branch control valve. In this configuration, all of the branched steam is subject to heat exchange at only one of the pair of heat exchange means 152a, 152b.

It should therefore be evident from the foregoing description of the present invention that there has been provided a new and improved method of reheating the flue gas generated in a fossil-fuel fired steam generating power plant prior to the flue gas entering a Selective Catalytic Reduction chamber.

Also in accordance with the present invention there has been provided such a new and improved method of reheating the flue gas generated in a fossil-fuel fired steam generating power plant whereby thermal stresses in the backpass are reduced.

In further accordance with the present invention there has been provided such a new and improved method of reheating the flue gas generated in a fossil-fuel fired steam generating power plant whereby bypass ducts with slide gates and the attendant problems of fouling, warpage and the need for control dampers therein is eliminated.

In still further accordance with the present invention, there has been provided such a new and improved method of reheating the flue gas generated in a fossil-fuel fired steam generating power plant whereby a portion of energy lost to the associated thermodynamic steam cycle due to desuperheating is utilized to reheat the flue gas.

While a preferred embodiment of my invention has been shown, it will be appreciated by those skilled in the art that modifications may readily be made thereto. I, therefore, intend by the appended claims to cover any modifications alluded to herein as well as to all modifications that fall within the true spirit and scope of my invention.

What is claimed is:

1. A method of controlling the temperature of superheated steam in a fuel-fired steam generating power plant of the type having a thermodynamic steam cycle and a flue gas flow path acting in cooperative association therebetween, said method comprising the steps of:

a. operating a first component of the thermodynamic steam cycle so as to produce thereby superheated steam at a first temperature and first pressure;

b. operating a second component of the thermodynamic steam cycle downstream of the first component and upstream of a turbine thereof,
   the second component being operable to receive the superheated steam at a second temperature less than the first temperature;

c. effecting an exchange of heat between the superheated steam and at least one heat exchange medium so as to thereby decrease the temperature of the superheated steam; and d. effecting the further processing of the at least one heat exchange medium and the further utilization of the superheated steam in the thermodynamic steam cycle.

2. The method as set forth in claim 1 wherein the step of effecting the further processing of the at least one heat exchange medium includes transforming at least one property of the at least one heat exchange medium from an initial condition of the at least one property which exists upon completion of the heat exchange to a subsequent condition.

3. The method as set forth in claim 2 wherein the step of effecting an exchange of heat between the superheated steam and the at least one heat exchange medium includes the step of effecting an exchange of heat between the superheated steam and the flue gas.

4. The method as set forth in claim 3 wherein the step of effecting an exchange of heat between the superheated steam and the at least one heat exchange medium includes the step of effecting an exchange of heat between the superheated steam and a plurality of heat exchange mediums.

5. The method as set forth in claim 4 wherein the step of effecting an exchange of heat between the superheated steam and the flue gas includes the step of providing a control system for controlling the exchange of heat between the superheated steam and the flue gas.

6. The method as set forth in claim 5 wherein the step of providing a control system includes the step of providing a controller, at least one sensor for sensing at least one boiler operating condition, at least one means for conveying at least one signal indicative of the at least one boiler operating condition to the controller, thermostatic control means for preselecting at least one temperature, means for conveying the preselected at least one temperature to the controller, a plurality of control valves for controlling the flow of a fluid therethrough, a plurality of means for conveying a plurality of valve command signals from the controller to the plurality of control valves.

7. The method as set forth in claim 6 wherein the step of effecting the exchange of heat between the superheated steam and the at least one heat exchange medium includes the step of exchanging heat between a first portion of the superheated steam and a first heat exchange medium and thence recombining the first portion of the superheated steam with a second portion thereof.

8. The method as set forth in claim 7 wherein the step of effecting the exchange of heat between the superheated steam and the at least one heat exchange medium includes the step of exchanging heat between a second portion of the superheated steam and a second heat exchange medium and thence recombining the second portion of the superheated steam with the first portion thereof.

9. The method according to claim 2 wherein the at least one property of the at least one heat exchange medium is the $NO_x$ concentration of the at least one heat exchange medium and the step of transforming the at least one property includes transforming the $NO_x$ concentration of the at least one heat exchange medium from an initial condition to a final condition.

10. A system for controlling the temperature of superheated steam in a fuel-fired steam generating power plant of the type having a thermodynamic steam cycle and a flue gas flow path acting in cooperative association therebetween, said system comprising:

a. a first component of the thermodynamic steam cycle operative to produce thereby superheated steam at a first temperature and a first pressure;

b. a second component of the thermodynamic steam cycle disposed downstream of the first component, the second component being operable to receive the superheated steam at a second temperature less than the first temperature;

c. at least one heat exchange means for effecting an exchange of heat between the superheated steam produced by said first component and at least one heat exchange medium so as to thereby decrease the temperature of the superheated steam;

d. means for forming a path for the flow of superheated steam from said at least one heat exchange means to said second component; and e. means for effecting the further processing of the at least one heat exchange medium after receiving heat from the superheated steam, said means for effecting the further processing of the at least one heat exchange medium being separate from said means forming a path for the flow of superheated steam from said at least one heat exchanger to said second component.

11. The system as set forth in claim 10 wherein the at least one heat exchange means comprises a plurality of heat exchange means in fluid flow relation thereamongst and in parallel configuration therebetween, the plurality of heat exchange means including a fluid flow bypass means.

12. The system as set forth in claim 11 further comprising a control system for controlling the exchange of heat between the superheated steam and the flue gas.

13. The system as set forth in claim 12 wherein the control system includes a controller, at least one sensor for sensing at least one boiler operating condition, at least one means for conveying at least one signal indicative of the at least one boiler operating condition to the controller, thermostatic control means for preselecting at least one temperature, means for conveying the preselected at least one temperature to the controller, a plurality of control valves for controlling the flow of a fluid therethrough, a plurality of means for conveying a plurality of valve command signals from the controller to the control valves.

14. A method of controlling the temperature of a flue gas in a fuel-fired steam generating power plant of the type having a thermodynamic steam cycle and a flue gas flow path acting in cooperative association therebetween, said method comprising the steps of:

a. operating a first component of the thermodynamic steam cycle so as to produce thereby superheated steam at a first temperature and first pressure;

b. operating a second component of the thermodynamic steam cycle downstream of the first component and upstream of a turbine thereof,
   the second component being operable to receive the superheated steam at a second temperature less than the first temperature; and
c. effecting an exchange of heat between the superheated steam and the flue gas so as to thereby decrease the temperature of the superheated steam; and
d. effecting the further processing of the flue gas and the further utilization of the superheated steam in the thermodynamic steam cycle.

15. The method as set forth in claim 14 wherein the step of effecting the further processing of the flue gas includes transforming at least one property of the flue gas from an initial condition of the at least one property which exists upon completion of the heat exchange to a subsequent condition.

16. The method according to claim 15 wherein the at least one property of the flue gas is the $NO_x$ concentration of the flue gas and the step of transforming the at least one property includes transforming the $NO_x$ concentration of the flue gas from an initial condition to a final condition.

* * * * *